Sept. 24, 1935.   G. W. BRADY   2,015,135
VALVE MECHANISM FOR INTERNAL COMBUSTION ENGINES
Filed April 24, 1934
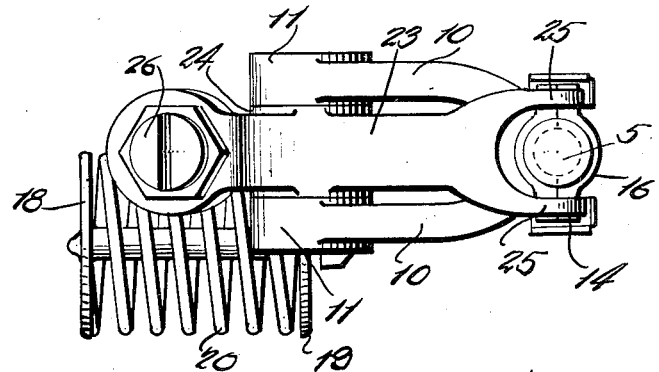
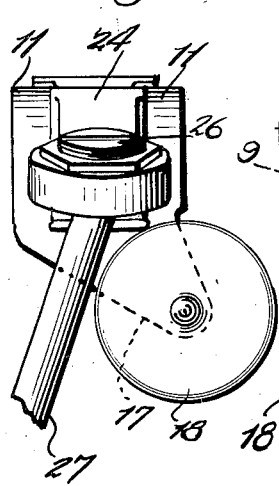

Patented Sept. 24, 1935

2,015,135

UNITED STATES PATENT OFFICE 2,015,135

VALVE MECHANISM FOR INTERNAL COMBUSTION ENGINES

George W. Brady, Anderson, Ind.

Application April 24, 1934, Serial No. 722,204

5 Claims. (Cl. 123—90)

This invention relates to certain new and useful improvements in valve mechanism for internal combustion engines.

The primary object of this invention is to provide a valve mechanism for internal combustion engines, especially of the type employed for the propulsion of aircraft and more especially of the so-called fixed radial type of multi-cylinder engines having overhead valves, which valve mechanism is re-designed for a material reduction in size for compact placement. Reduction in overall engine size is thereby accomplished, which, especially when the engine is mounted in an aircraft, will reduce drag or head resistance and increase efficiency of operation of the aircraft.

It is a further object of the invention to provide valve mechanism of the foregoing character wherein the operating devices for the valve that is of the overhead type are positioned laterally of the associated valve and in a compact manner for a material reduction of head resistance or drag.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of the improved operating mechanism for an overhead valve of an internal combustion engine;

Figure 2 is a side elevational view, partly in section of the valve mechanism with a part of the engine shown by dot and dash lines;

Figure 3 is an outer end elevational view of the valve mechanism;

Figure 4 is an exploded perspective view of the upper end of the valve stem and split roller bearing collar attached thereto.

In radial aircraft engines of the type embodying an overhead valve gear, a considerable portion of the diameter of the engine is occupied by the valve gear which increases drag or head resistance during flight and the primary object of the invention being to overcome such deficiency, the valve operating mechanism has been re-designed, arranged in a compact manner and placed with the idea of considerably reducing the diameter of the engine, the operating mechanism being preferably located laterally of its associated valve for the positive operation of the valve in its opening and closing movement. The valve is of the conventional type and embodies a stem 5 that is greatly reduced in length, having upon its inner end a valve 6, the stem being guided in its movement through the sleeve 7 while a portion of the engine is illustrated by dot and dash lines as at 8. The operating mechanism for the valve 6 is positioned laterally of the valve and is located within a housing as shown at 9, which has a removable cover 28.

The operating means for the valve 6 includes a forked rocker arm comprising arms 10 provided with a bearing 11 at the free end of each arm for rotatable support upon the shaft 12 within the housing 9, the other end of the rocker arm being bifurcated to provide a pair of short arms 13 straddling the upper end of the valve stem 5 above the guide sleeve 7 for engagement with the underside of anti-friction rollers 14 journalled on split radial pins 15 carried by the two halves of the split collar 16 that is supported in a groove 5a of the valve stem 5 in such a manner as to be rigidly attached for vertical travel of the valve while permitting rotary motion of the valve. The bifurcated arms 13 are so shaped as to hold the split collar 16 and the friction rollers 14 in their proper position. A depending laterally projecting leg 17 is carried by the bearing ends 11 of the rocker arm for engagement with a spring device that holds the rocker arm in position with the valve 6 engaged with its seat.

The spring device comprises a pair of disk members 18 and 19 for support by interposed coil springs 20, the disk members 18 and 19 being guided in their movements by the socketed stud 21 carried by the disk 18 and projecting through the coil springs 20 to receive the pin 22 carried by the disk member 19. The disk member 18 is engaged with an end wall of the housing 9 and the disk member 19 is engaged with the depending leg 17 of the rocker arm.

The spring device and rocker arm are employed for closing the valve 6 on its seat and means are provided for effecting opening movements of the valve such means comprising a lever 23 having a bearing 24 intermediate its ends for rotatable support on the shaft 12 between the bearings 11 of the rocker arms 10. One end of the lever 23 is bifurcated to provide side legs 25 that straddle the upper end of the valve stem 5 and are engaged with the upper sides of the anti-friction rollers 14. The other end of the lever 23 has a universal bearing seat 26 at the opposite side of the shaft 12 for the support and engagement of the upper end of a lift rod 27 that is in communication with the cam shaft or other operating part of the engine. As shown in Figure 3, the lift rod 27 is angularly disposed and by the lateral offset of the depending leg 17 of the rocker arm, clearance for the mounting of the spring device 20 and the lift rod 27 is provided. Upon upward movement of the lift rod 27, the lever 23 is operated for positively lowering the valve stem 5 and unseating the valve 6 and as stated, the valve 6 is closed upon its seat by the spring device 20 engaging with the depending leg 17.

It will be observed that the entire operating mechanism for the valve 6 is confined within a housing that is located laterally of the valve, this arrangement resulting in the compact placement of the element and a material shortening of the radial dimensions of the engine, thereby reducing what is known in the art as drag or head resistance in radial aircraft engines.

It should be noted that one modification in particular may be made without departing materially from the preferred embodiment of the invention. If the split collar 16 is directly anchored to the valve stem 5 that part of the valve stem 5 projecting above the collar 16 may be cut off and the lever 23 may bear directly on the valve stem 5 rather than on the anti-friction rollers 14 without losing any of the advantages of the compact design of the valve mechanism shown in the drawing.

I claim:—

1. In an internal combustion engine embodying overhead valves, operating mechanism for the valves positioned laterally thereof to shorten the overall dimensions of the engine, and including a tensioned rocker arm for seating the valve, a bearing for said rocker arm, a lever pivoted on the rocker arm bearing and engaged with the valve stem for unseating the valve and lifting means operatively engaged with the lever.

2. In an internal combustion engine embodying overhead valves, operating mechanism for the valves positioned laterally thereof to shorten the overall dimensions of the engine, said operating mechanism being positioned at all times within the length of the valves, and including a tensioned rocker arm for seating the valve, a bearing for said rocker arm, a lever pivoted on the rocker arm bearing and engaged with the valve stem for unseating the valve and lifting means operatively engaged with the lever.

3. In an internal combustion engine embodying overhead valves, operating mechanism for the valves positioned laterally thereof to shorten the overall dimensions of the engine, and including a rocker arm engaged with the valve stem, a bearing for said rocker arm, a leg projecting laterally of the rocker arm, a spring device engaged with the leg for moving the rocker arm to seat the valve, a lever pivoted on the bearing for the rocker arm and engaged with the valve stem and lifting means engaged with the lever for moving the same and positively unseating the valve.

4. In an internal combustion engine embodying overhead valves, operating mechanism for the valves positioned laterally thereof to shorten the overall dimensions of the engine, said operating mechanism being positioned at all times within the length of the valves, and including a rocker arm engaged with the valve stem, a bearing for said rocker arm, a leg projecting laterally of the rocker arm, a spring device engaged with the leg for moving the rocker arm to seat the valve, a lever pivoted on the bearing for the rocker arm and engaged with the valve stem and lifting means engaged with the lever for moving the same and positively unseating the valve.

5. In an internal combustion engine embodying overhead valves, operating mechanism for the valves positioned laterally thereof and inwardly of the outer end of the valve stem, and including a rocker arm of bell crank form having one leg engaged with the valve, a spring device engaged with the other leg of the rocker arm for seating the valve, a lever engaged with the valve and a lift rod engaged with the lever for moving the same and positively unseating the valve.

GEORGE W. BRADY.